No. 623,753. Patented Apr. 25, 1899.
J. F. WINCHELL.
MACHINE FOR REMOVING PITH OR CELLULOSE FROM STALKS.
(Application filed May 9, 1898.)
(No Model.) 4 Sheets—Sheet 1.
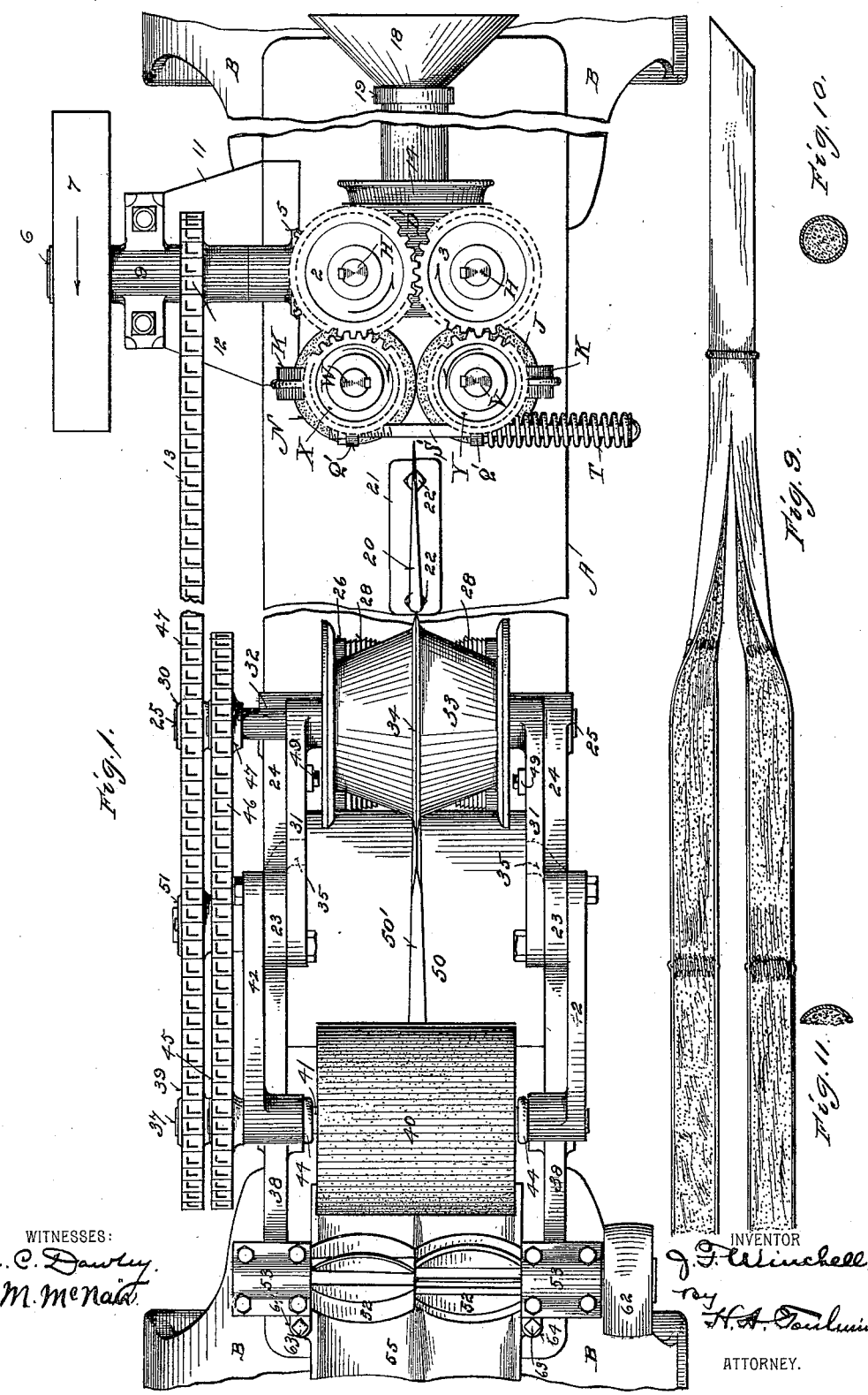
WITNESSES:
INVENTOR
ATTORNEY.

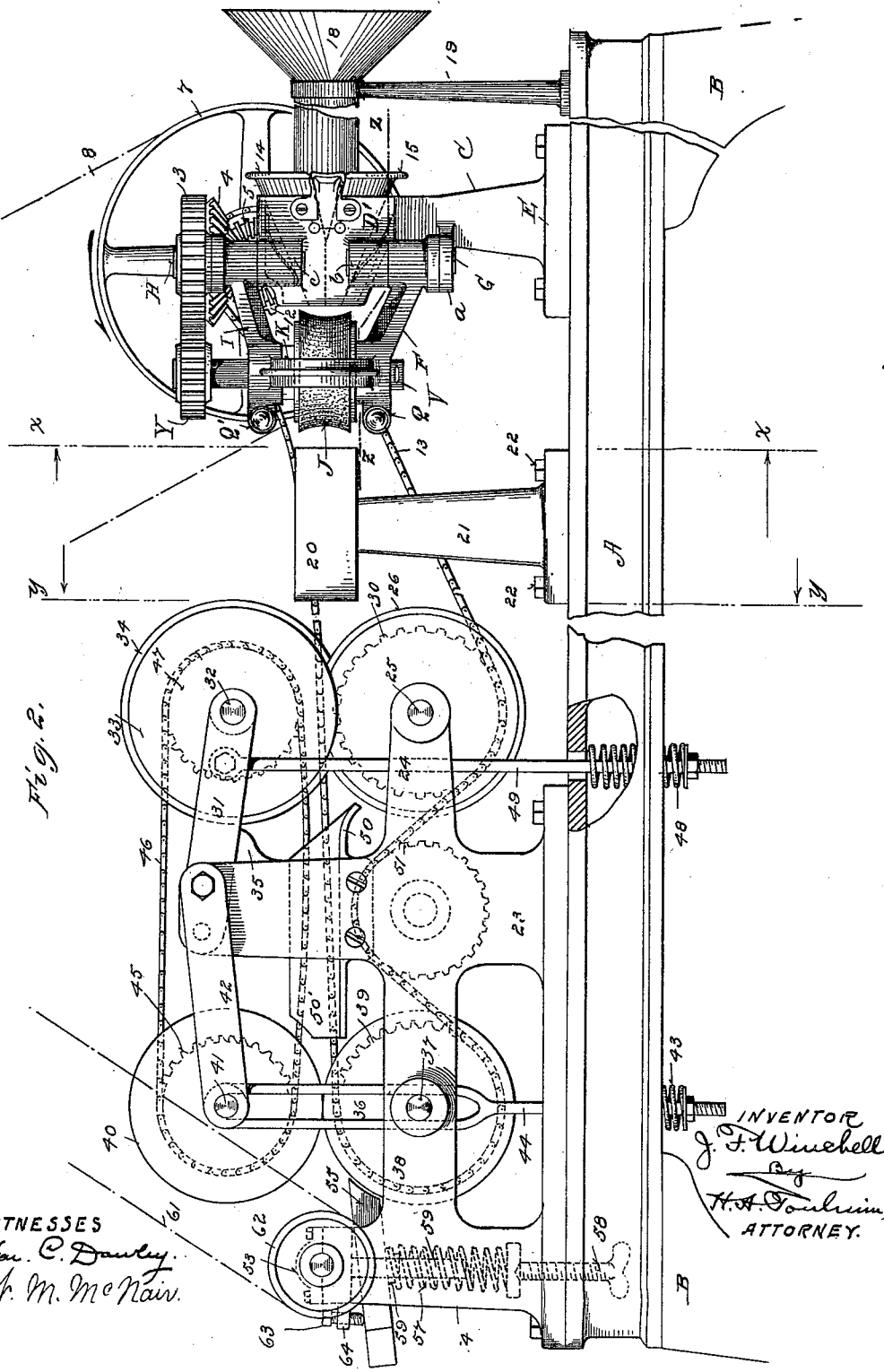

No. 623,753. Patented Apr. 25, 1899.
J. F. WINCHELL.
MACHINE FOR REMOVING PITH OR CELLULOSE FROM STALKS.
(Application filed May 9, 1898.)
(No Model.) 4 Sheets—Sheet 3.
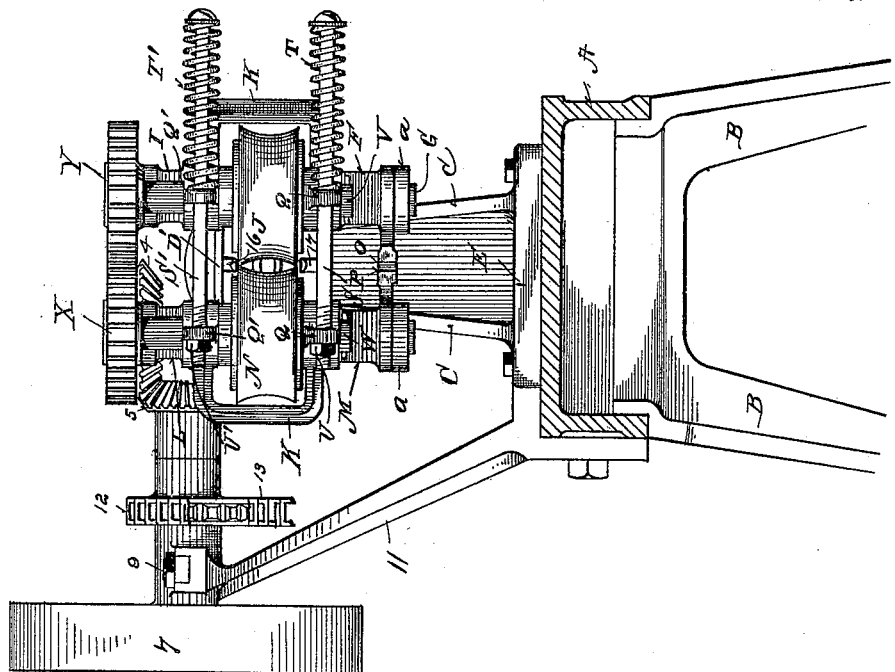
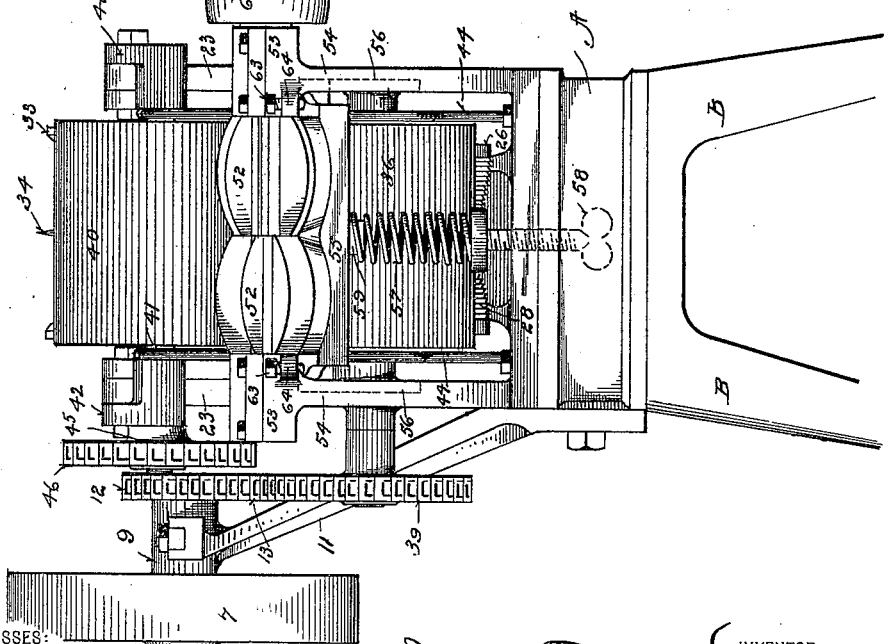
WITNESSES: INVENTOR
James Frank Winchell,
BY
ATTORNEY.
THE NORRIS PETERS CO., PHOTO-LITHO., WASHINGTON, D. C.

No. 623,753. Patented Apr. 25, 1899.
J. F. WINCHELL.
MACHINE FOR REMOVING PITH OR CELLULOSE FROM STALKS.
(Application filed May 9, 1898.)
(No Model.) 4 Sheets—Sheet 4.
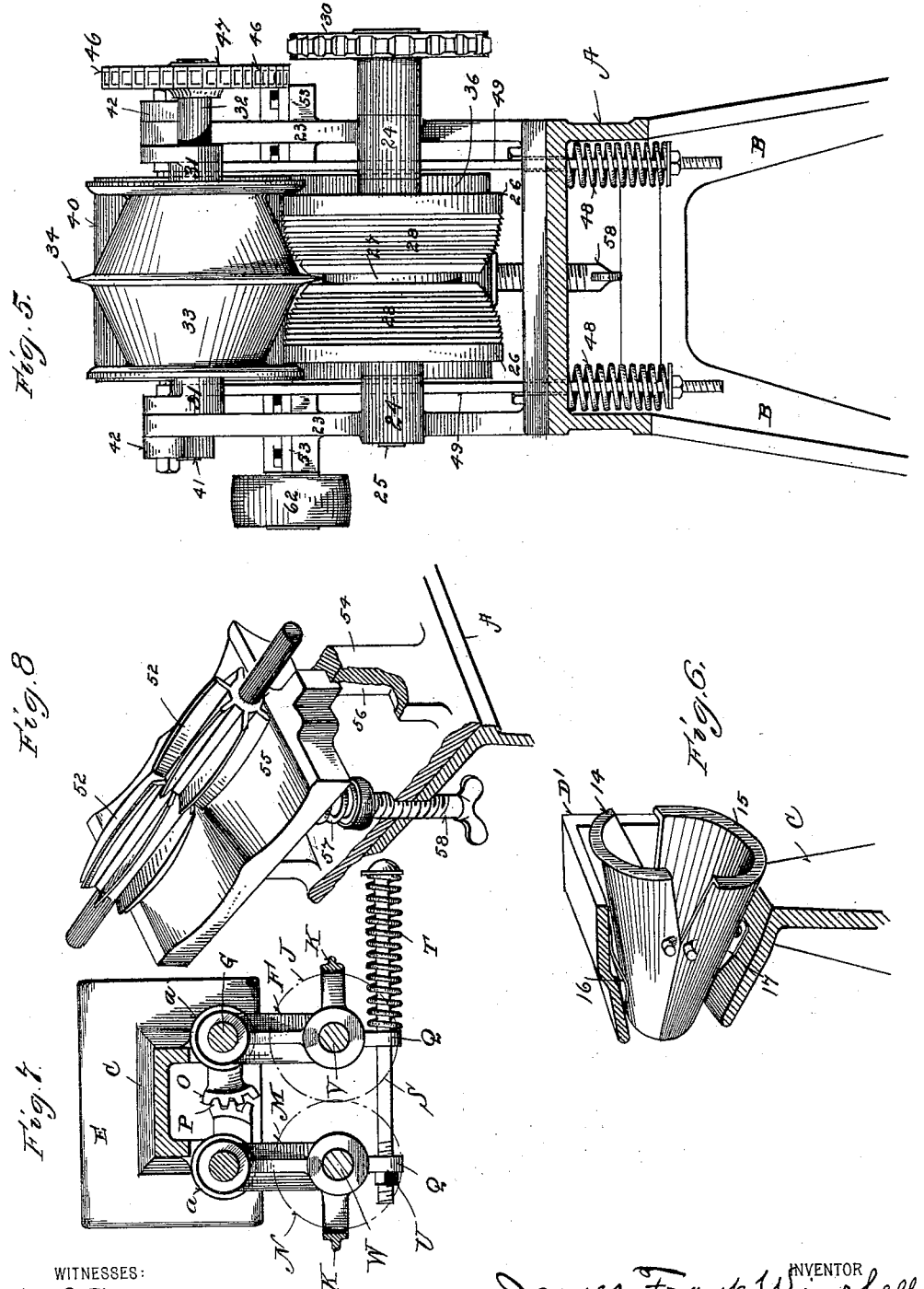
WITNESSES:
Jac. C. Dawley.
W. M. McNair.
INVENTOR
James Frank Winchell,
BY
H. A. Toulmin,
ATTORNEY.

UNITED STATES PATENT OFFICE.

JAMES F. WINCHELL, OF SPRINGFIELD, OHIO, ASSIGNOR TO THE FOOS MANUFACTURING COMPANY, OF SAME PLACE.

MACHINE FOR REMOVING PITH OR CELLULOSE FROM STALKS.

SPECIFICATION forming part of Letters Patent No. 623,753, dated April 25, 1899.

Application filed May 9, 1898. Serial No. 680,091. (No model.)

*To all whom it may concern:*

Be it known that I, JAMES F. WINCHELL, a citizen of the United States, residing at Springfield, in the county of Clark and State of Ohio, have invented certain new and useful Improvements in Machines for Removing Pith or Cellulose from Stalks, of which the following is a specification, reference being had therein to the accompanying drawings.

This invention relates to certain new and useful improvements in machines for removing pith or cellulose from stalks.

The object of my invention is to provide suitable mechanism for removing the pith or cellulose from stalks, such as cornstalks, without destroying the cellular quality of the cellulose and without removing from the shell any material portion of its inner fibrous coating; and to that end my invention has reference, first, to stalk feeding and centering mechanism capable of equal expansion from the center line, whereby stalks irrespective of their diameters may be centrally fed to the stalk-splitting device; second, to means for unfolding the stalks after being operated upon by said stalk-splitting device, whereby the pith or cellulose in said unfolded parts will be exposed to the pith or cellulose remover; third, to means for feeding and retarding the unfolded parts of the stalk being operated upon by said remover, and, fourth, to certain pith-removing mechanism for removing the pith or cellulose from said split stalks.

My invention also relates to details of construction hereinafter appearing and particularly pointed out in the claim.

In the accompanying drawings, on which like reference letters and numerals indicate corresponding parts, Figure 1 is a plan view of my machine complete. Fig. 2 is a side elevation of the same. Fig. 3 is a sectional elevation on the line $xx$ of Fig. 2 looking in the direction of the arrows. Fig. 4 is an end elevation showing the pith-removing mechanism. Fig. 5 is a sectional elevation on the line $yy$ of Fig. 2 looking in the direction of the arrows; Fig. 6, a detail view of the conical stalk-centering device; Fig. 7, a sectional view of a portion of the stalk-centering mechanism on the line $zz$ of Fig. 2; Fig. 8, a detail perspective view of the pith-removing mechanism; Fig. 9, a detail view of a portion of a stalk after it has been partially operated upon by my machine; Fig. 10, a cross-sectional view of said stalk before it has been operated upon by the stalk-splitting device, and Fig. 11 a cross-sectional view of one portion of the stalk after it has been operated upon by the splitting device.

The letter A represents a suitable bed supported on legs B. Upon this bed are mounted the various working parts of my invention.

Referring now to the stalk-centering mechanism, it will be seen that it is supported by suitable standards C and D, extending from the base E and bolted or otherwise secured to the bed A. Lugs or projections $a$, $b$, and $c$ extend from each of said standards. Between the lugs $a$ and $b$ is pivoted an arm F by means of a pin G, while upon the projection $c$ is pivotally mounted, by means of a pin H, another arm I, similar to the arm F. These arms have in them the arbor of a grooved roller J and are securely held together by means of a bridge K, which is cast or otherwise secured to said arms. It will be observed that the standard D is likewise provided with arms L and M, respectively, and that these arms are connected together in the same manner as the arms I and F, and that they also have a grooved roller N, mounted on an arbor journaled between them. The inner ends of the arms F and M are turned inward, as clearly shown in Fig. 7, and are each provided with a set of teeth O and P, which intermesh with each other. The outer ends of both sets of arms have extensions Q and Q'. A screw-threaded rod or bolt passes through the extensions Q and has a spring T mounted thereon between the head of the bolt and one of the extensions Q, the nut U being adapted to tighten or loosen the tension of the spring. The arms I and L also have a rod S' passing through their extensions Q', with a spring T'. The tension of this spring T' may also be regulated by the nut U'. It will be seen that when stalks pass between the rollers N and J any pressure on the roller J more than the pressure on the roller N will tend to throw the roller J outward, but the least movement of the roller J will cause the roller N to be thrown in the opposite direction a similar extent by reason of their toothed connection with each other. The extent the two rollers are thrown apart will be governed by the size of the stalk and the tension of the spring. In passing it will be observed that the stalk itself, whether large or small or whether pressing on one roller more than on the other, will not deflect the rollers from feeding said stalk in a predetermined central line. The grooved rollers N and J have arbors V and W, upon the upper end of which are mounted gears X and Y, respectively. These gears engage with and are driven by gears 2 and 3, respectively, which, it will also be seen from Fig. 1, intermesh with each other. These gears 2 and 3 are mounted on stud-shafts H and receive motion through bevel-gears 4 and 5, the bevel-gear 4 being also mounted on one of the stud-shafts H beneath the gear 2, and which engages with the bevel-gear 5, carried by the shaft 6, driven by a belt passing over a driving-wheel 7, carried thereby, the belt being indicated at 8 in Fig. 2, and which preferably receives motion from a line-shaft. (Not shown.) The shaft 6 is suitably mounted in a bearing 9, the former being supported by the brace 11, bolted or otherwise secured to the bed A, as clearly shown in Fig. 3. On this shaft 6 is also rigidly mounted a sprocket driving-wheel 12, over which passes a driving sprocket-chain 13 for driving various parts of the machine, as will hereinafter appear.

I have described above the principal mechanism for centering the stalks. I will now describe another but subordinate part of the centering mechanism for the stalks. This consists of a divided conical spout, as shown at 14 and 15. Each of the parts 14 and 15 is pivoted within a head D'. These parts are firmly held together at their inner or smaller ends by means of springs 16 and 17, secured at one end to said head D'. A feed-spout 18, supported by a standard 19, is adapted to conduct the stalks to be fed to the machine through the divided conical part of the centering mechanism. This conical part opens the proper amount to receive the stalk of corn, no matter what its size may be and each portion being equally spring-pressed they will each yield a like degree regardless of the size of the stalk passing through them, so that the center of the stalk will be maintained in a predetermined line. From this conical part of the feeding mechanism the stalk passes between the grooved rollers J and N, which also center the stalk so that it is fed centrally against the edge of a knife 20, which constitutes my stalk-splitting device. This knife 20 is supported by a standard 21, preferably secured to the bed A by means of bolts 22, as clearly seen in Fig. 2. As seen in Fig. 1, this stalk-splitting device is tapered from its cutting edge. This is for the purpose of delivering the split parts of the stalk in a divided condition to the stalk deploying and feeding mechanism, which I will now describe, the term "deploying" being understood to mean turning or opening outward the split stalk.

The standards 23 have forward extensions 24 projecting therefrom. A shaft 25 passes through these extensions and has mounted upon it a roll 26, having a circumferential depression 27. On either side of this depression and sloping upward therefrom are a number of circumferential corrugations 28. On the outer end of the shaft 25 is mounted a driving sprocket-wheel 30, which is operated by means of the sprocket-chain 13, above referred to. To the upper end of each of the standards 23 is pivoted a link 31. The outer ends of these links support a shaft 32, upon which is mounted a double-taper roll 33, having an annular projection 34, which serves the purpose of deploying or partially turning over the split stalks, which divide as they leave the stalk-splitting device above referred to. The rolls 26 and 33 also aid in feeding the stalks, and the corrugations 28 prevent the split portions of the stalks from separating too far. The double-taper roll 33 is limited in its downward movement by stops 35, extending from the standards 23. This roll is driven in a manner presently to appear.

Referring now to the feeding and retarding rolls, it will be seen that the roll 36 is mounted on a shaft 37, supported inside rails 38, connected with posts 23 and 54, secured to the bed A. This roll is preferably formed of rubber, for the purpose hereinafter appearing, and is driven by the sprocket-chain 13, passing around a sprocket-wheel 39. Directly above the roll 36 is yieldingly mounted a similar roll 40 on a shaft 41, carried in arms 42, pivoted to the post 23. The roll 40 presses directly against the roll 36, and the stalks after leaving the deploying and feeding mechanism are more or less pressed, as desired, according to the tension of the springs 43, which pull down on slotted bars 44, connected to the shaft 41, as will readily be seen by referring to Fig. 2. The roll 40 is keyed or otherwise secured to the shaft 41, and on the other end of said shaft is mounted a driving sprocket-wheel 45. A sprocket-chain 46 connects this driving sprocket-wheel 45 with a driven sprocket-wheel 47, mounted on the shaft 32, which carries the double-taper roll 33. Thus when the feeding and retarding roll 40 is driven the double-taper roll of the deploying and feeding mechanism will also be driven. Referring again to the double-taper roll, it will be seen that it is controlled by springs 48, mounted on rods 49, pivotally connected to the arms 31, which springs press against the under side of the bed A and act to hold said double-taper roll in its lowest position. Thus no matter what size the stalk may be it will pass beneath the roll and at the same time escape being broken and unduly mashed.

Between the deploying and feeding mechanism and the feeding and retarding mechanism is mounted a bridge 50, which supports the stalks and prevents them from falling down or breaking before the feed and retarding rolls can act on them and has a central ridge or fin 50'. This bridge is screwed or otherwise secured to the posts 23. In order that the driving-chain 13 may engage more of the teeth of the sprocket-wheels 30 and 39, I provide an idler sprocket-wheel 51, carried by the post 23, over which the sprocket-chain passes. This raises the chain between the sprocket-wheels and brings said chain farther up around them.

I will now refer to the pith-removing mechanism. This consists of a plurality of pith-scrapers 52, rotatably mounted in suitable boxes 53, supported by posts 54, and of a yielding platform 55, which is mounted to travel up and down in ways 56 in the posts 54.
A spring 57, carried by a thumb-screw 58, extending through the bed and screw-threaded therein, is coiled about a stud 59, projecting from the under side of the platform, and is adapted to support the platform. This stud acts to limit the downward movement of the platform. The upper surface of the platform is slightly grooved to more readily accommodate the outer surface of the now nearly though not quite flattened condition of the cornstalks, as also the similar curve of the scraper-blades 52. These blades are preferably left blunt along their outer edge and beveled so as to take off the rearward corner, as shown in Fig. 8, and consequently instead of cutting the pith they act to scrape it out, having also a beating action. These scrapers are usually given a velocity of about four thousand revolutions per minute, but if run slower the size of the removed cellulose fragments will be larger, and if run faster such fragments will be smaller. Thus I can control the size of the pieces of the product to suit its intended subsequent treatment, or the stalks may be fed faster or slower and the same range of result in the product be produced with one given speed of the remover. A belt 61 (shown in dotted lines in Fig. 2) passes over a pulley 62, connected with the scrapers, and thus revolves them. The belt 61 is driven by any suitable line-shaft. (Not shown.) In order to prevent the spring 57 from raising the platform too close to the scrapers, I provide set-screws 63, carried by extensions 64 from the posts 54. These set-screws may be adjusted to regulate the distance between the platform and scrapers to just the right amount to give the best results. As the split stalks pass through the feeding and retarding rolls they drop onto the yielding platform and pass beneath the scrapers, which remove the pith completely. When, however, the joints in the stalks reach the platform, the joints raise the stalks because the joints form ridges on the outside of the stalks. In order to prevent the inside of the stalk being thus presented too close to the pith-removers, I arrange for momentarily enlarging the normal space between such platform and such remover. This is done in the form of construction selected for illustration by yieldingly supporting the platform on a spring. The purpose of letting the stalk down a little when the joint passes under the remover is to prevent the remover from reaching the hard and woody part composing the inside of the stalk adjacent to the joint, which woody and fibrous part, if removed and mixed with the pith or cellulose, would deteriorate or lower the grade of the latter.

In operation the stalks are fed through the centering and feeding mechanism and are conducted centrally against the splitting device, which splits them throughout their entire length, during which the deploying and feeding rolls act to turn or open the split stalks upward. As soon as they are sufficiently advanced by the deploying and feeding rolls they are engaged by the feeding and retarding rolls, which in turn feed them to the pith-removing mechanism. Inasmuch as the scrapers are rotated at such a high velocity, it is necessary to hold the stalks from being drawn through this latter mechanism too rapidly. This is accomplished by means of the feeding and retarding rolls. When the feeding and retarding rolls no longer act on the stalks, they are thrown by the remover mechanism beyond and apart from the cellulose, and consequently are prevented from mixing with the cellulose.

By forming the rolls of the centering and feeding mechanism and the feeding and retarding rolls of rubber, the stalks are not broken or injured, as the rubber will yield to any irregularities.

As before observed, the principal part of the initial feeding and centering mechanism is composed of the rolls, which are so arranged as to move equally to and from a central line. This feature preceding the dividing or splitting knife gives the important stated result of directing practically the center of every cornstalk to the edge of the knife without regard to the varying sizes of stalks. It will further be observed that the deploying and feeding rolls which follow the knife also act with a retarding function upon the cornstalks when they have reached the point where the remover is exerting a pulling force upon them, since at that time they tend to move more rapidly than these feeding-rolls feed them.

Referring again to the last set of rolls preceding the pith-remover, which I have called the "feeding" and "retarding" rolls, I would have it understood that it is important that these rolls be of as large diameter, while the pith-remover should be of as small diameter, as practicable. This is for the purpose of lessening to the utmost the distance from the axial centers of these rolls to that of the remover, as by so doing the loss of cellulose at the end of the stalk after it leaves such retarding-rolls is reduced. It is further to be observed that while I have referred to the deploying-roll as also having a feeding function and at times a retarding function it is to be understood that it is essentially a deploying-roll, as that is its primary purpose in my organization. It will be observed also that the stalks are partially flattened by the last pair of rolls and that the remover is shaped to fit the now-partially-flattened stalks in order to entirely remove pith from the edges of the stalk, which I have found cannot be rapidly and throughly done if the remover is of a contour matching, essentially, with the cross-section of the divided cornstalk. The reason is that in such case the edges spring out and do not stand up to the action of the remover, while the more central body of the stalk cannot yield away from the remover and is therefore being properly stripped of the pith. So I say that there is a useful function performed by and a useful result derived from this partial flattening of the deployed parts of the stalk by the rolls preceding the remover and by making the remover of a shape to fit such nearly-flattened parts of the stalk.

Having thus fully described my invention, what I claim as new, and desire to secure by Letters Patent, is—

In a machine for removing pith or cellulose from stalks, the combination with a base having stalk feeding and centering mechanism and a stalk-splitter thereon, of stalk feeding and deploying mechanism having a lower roll mounted in stationary bearings and an upper double-taper roll mounted in swinging bearings and normally held down, feeding and retarding rolls, the lower one of which is mounted in stationary bearings and the upper one of which is mounted in swinging bearings which are spring-controlled, whereby the said upper roll is normally held against the said lower roll and driven thereby, and means for interconnecting the swingingly-mounted rolls of the feeding and unfolding mechanism, and the feeding and retarding rolls, whereby when the swinging roll of the feeding and retarding rolls is revolved the double-taper roll will also be revolved, and a pith-removing device for removing the pith from said split stalks fed to it by said feeding and retarding rolls.

In testimony whereof I affix my signature in presence of two witnesses.

JAMES F. WINCHELL.

Witnesses:
   W. M. MCNAIR,
   P. A. SCHAEFER.